Figure 1:
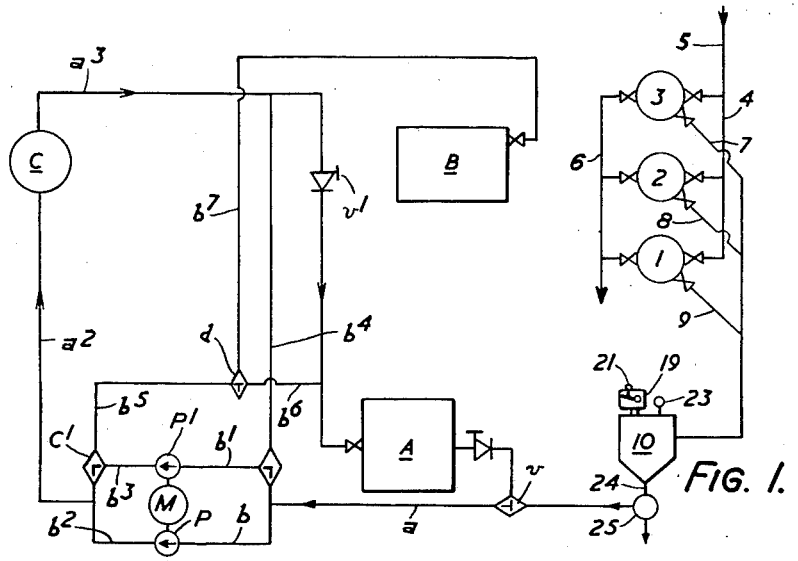

Oct. 2, 1962

R. E. LIDDELL 3,056,499

FILTRATION OF LIQUIDS

Filed July 28, 1959

INVENTOR
ROBERT EMOND LIDDELL

BY Watson, Cole, Grindle
  + Watson

ATTORNEYS 3,056,499
FILTRATION OF LIQUIDS
Robert Emond Liddell, Coatbridge, Scotland, assignor to Yarrow and Company, Glasgow, Scotland
Filed July 28, 1959, Ser. No. 830,137
Claims priority, application Great Britain Sept. 26, 1958
2 Claims. (Cl. 210—108)

This invention relates to filtering means for liquids which includes two or more filter units having their inlets connected in parallel with a common main supply conduit for the liquid to be filtered and their outlets connected in parallel with a common delivery pipe through which the filtered liquid is taken off. In my U.S. patent application Serial No. 607,807, now Patent Number 2,954,872, there is disclosed a method of cleaning individual filter elements which includes isolating the inlet side of the chamber of the unit to be cleaned from the common outflow conduit and connecting the inlet side to a closed drain tank, directing a flow of filtered reflux liquid from the common outflow conduit through the filter element into the drain tank, the reflux flow being stopped automatically when the air in the drain tank is compressed to a pressure substantially corresponding to that in the common outflow conduit.

According to the present invention the method is modified in that a drain tank is provided fitted with an air vent at its upper end and which is open to atmosphere at the start of a filter cleaning operation the tank having a volume only slightly greater than the volume of unfiltered liquid normally present in the filter casing of a filter unit on the inflow side of the filter element to be cleaned, the modified method including the steps of isolating the inlet side of the filter casing of the filter unit to be cleaned from the inflow conduit and connecting said inlet side to the said drain tank, permitting a reflux flow of liquid from the common outlet into said casing through the filter element so as to clean the latter and displace the volume of unfiltered liquid in the casing on the inflow side of the element and effect its discharge from the casing into the drain tank, and effecting the automatic closing of the air valve when said volume of liquid has been admitted into the tank, the reflux flow continuing to flow into said tank until the air trapped at the upper end of the tank on the closing of the air vent, is compressed to a pressure substantially corresponding to that obtaining in the common outflow conduit. Thereafter the filter can immediately be restored into service by isolating it from the drain tank and opening its inflow valve.

After isolating the said filter casing from the drain tank when the reflux flow has stopped, the method may include the further step of opening a drain valve in the drain tank so that the liquid may be drawn off by a purification plant. The air vent valve would then open automatically to admit air to the drain tank as the liquid is removed. The liquid after passing through the purification plant is retured to the liquid circulating in the filter system, the apparatus being re-set for another cleaning operation by closing the drain tank drain valve.

Figure 2:
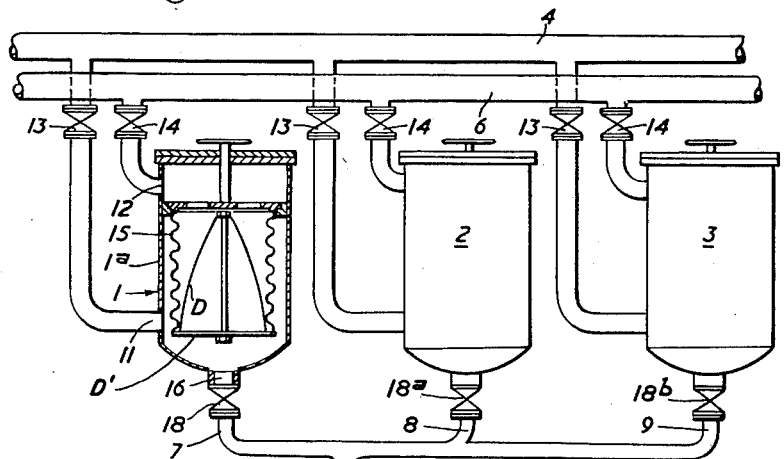

To enable the invention to be fully understood it will now be described with reference to the accompanying drawings in which:

FIGURE 1 illustrates in diagrammatic form a filter and purification plant including filtering means according to one embodiment of the invention, and FIGURE 2 is a side view partly in section of the filter unit per se.

As shown in FIGURE 1 of the accompanying drawings the filter assembly includes three filter units 1, 2, 3, the inlets of which are connected in parallel to a common inflow oil line 4 leading from a flow line 5 of a lubricating system for a machinery installation. The outlets of the units are connected in parallel to a common outflow oil line 6 adapted to be connected in the flow line of the system. The filter units are also respectively connected by conduits 7, 8, 9 with a drain tank 10.

The filter units 1, 2, 3 are of identical construction and as shown more particularly in FIGURE 2 include a casing 1a having an inlet 11 and an outlet 12 respectively connected with the common inflow and outflow lines 4, 6 inlet and outlet shut-off valves 13, 14 being provided for each unit.

A hollow cylindrical filter element 15 is located centrally in the casing 1a, the cylindrical wall of the element being spaced inwardly of the wall of the casing to permit the flow of liquid to be filtered round the element and after passing therethrough, to flow through the outlet 12 into the common outflow 6.

A member D of paraboloid, pyramidal or like shape is provided within each filter element, its base resting on a plate $D^1$ which also serves to close the lower end of the filter element. The member D serves the dual purpose of reducing the effective volume of liquid that can be present in the filter at any time and also acts as a deflector for reflux flowing liquid in effecting a cleaning operation as will be described later.

The casings are also provided with drain openings 16 connected to drain conduits 7, 8, 9 the respective conduits opening into a pipe 17 which opens into the lower end of the drain tank 10. Valves 18, 18a, 18b are provided for controlling the flow of liquid from the filter units into the conduits 7, 8, 9, the valves being of the type that can be rapidly moved from fully closed to fully open position and vice versa.

A chamber 19 is located on the tank 10 and a pipe 20 having a series of apertures 20a is provided for permitting air and or liquid to flow from the tank 10 to the chamber 19. An air release valve 21 is provided at the top of the chamber and adapted to be controlled by a float 22, the valve 21 being normally in open position so that the chamber 19 and tank 10 are filled with air at atmospheric pressure. As shown a pressure gauge 23 is mounted on the upper wall of the tank 10, and a drain pipe 24 having a valve 25 is connected with the base of the tank to enable the contents of the tank to be discharged, when desired, into the flow line a of the oil separation and purification plant illustrated in FIG. 1.

The drain tank 10 has a volume which is slightly greater than the volume of unfiltered liquid normally present in a filter casing 1a on the inflow side of the filter element 15.

The lubrication system with which the filter units are connected is such that the normal flow of oil can be dealt with efficiently by using only two of the filter units, the third serving as a reserve or stand-by to be brought into use when the other filters require cleaning.

Assuming that the filter units 1 and 2 are being used and that the unit 3 is the stand by, the inlet and outlet valves 13, 14 will be open in the case of units 1 and 2 and closed in the case of the unit 3, the drain valves 18, 18a, 18b will, however, be closed to isolate the units from the drain tank 10 and the valve 25 would also be closed and the air vent 21 open to permit air to enter the tank, which will accordingly be maintained at atmospheric pressure.

During the normal operation, oil to be filtered will flow through the common inflow line 4 into the filter casing of the units through the inlets 11, pass through the filter elements 15 which in known manner serve to trap any dirt, sludge or other foreign matter entrained in the oil, the filtered oil then flowing through the outlets 12 to the common outflow line 6.

Should it be desired to clean a filter element, for example the unit 1, the stand-by unit is brought into use by opening its valves 13, 14. The cleaning of the filter 1 is then effected by closing the inlet valve 13 and then opening the valve 18. As the outlets of the units are connected in parallel with the outflow line 6, oil will continue to flow into the outflow line from units 2, 3 which are in operation, and the oil will accordingly be flowing through the outflow line at a pressure which will be much higher than atmospheric pressure. In consequence, as the drain tank 10 is at atmospheric pressure, when the valve 18, which is a quick opening valve, is rapidly moved to fully open position, there will be a rapid reflux flow of oil from the outflow line 6 into the unit 1. The oil, which will be flowing in the reverse to normal direction, will be deflected by the member D to pass outwardly through the wall of the filter element 15 and thence through the conduit 7, flow into the drain tank 10. This sudden surge of reflux oil will be sufficient to dislodge any dirt, sludge or any other foreign matter adhering to the element and carry it through the conduit 7 into the drain tank.

As the volume of the drain tank is at least equal to the volume of unfiltered liquid in the casing 1a, the whole of this volume of unfiltered liquid will be displaced from the casing into the drain tank together with the foreign matter dislodged from the filter element.

The entry of this liquid into the drain tank will cause air to be discharged from the tank through the air release valve 21 until the pressure of air and or liquid transmitted through the pipe 20 causes the float 22 to rise and close the valve 21. A cushion of air will be trapped in the tank 10 when the valve is closed and the reflux flow of liquid will continue for a short time until this cushion of air is compressed to the pressure substantially corresponding to that obtaining in the common outflow line 6 when the equalization of the pressures will automatically halt the reflux flow without shock.

The deflector D is so shaped as to deflect the reflux flow of liquid uniformly through all parts of the wall of the filter element so that the whole of its surface will be effectively cleaned.

It will be noted, however, that the volume of reflux liquid that is permitted to flow through the filter element is predetermined, as irrespective of the pressure obtaining in the outflow line, the reflux flow is automatically halted after this predetermined volume of liquid has entered the drain tank. This is achieved by the provision of the automatically closable air release valve and providing that the drain tank shall have the prescribed volume referred to.

With the arrangement according to my earlier United States Patent Application Serial No. 607,807, now Patent Number 2,954,872, the volume of reflux flow in effecting a cleaning operation varied with the pressure obtaining in the outflow pipe and if the pressure in the outflow line were low, a relatively small volume of reflux liquid flowing through the filter casing would be sufficient to equalize the pressure in the filter casing and drain tank thus necessitating the provision of a large drain tank in order to effect adequate translation to displace the contaminated liquid from the exterior of the element. As a result an undesirably large volume of filtered liquid would be withdrawn from the normal circulation of the lubricating system during cleaning operations at normal or higher than normal pressures and further the time taken by a cleaning and purification operation would generally be prolonged. With the present arrangement these disadvantages are avoided and the size of the drain tank can be considerably reduced as the volume of reflux liquid will be substantially the same for each cleaning operation irrespective of the pressure in the outflow line 6.

A further advantage is that the whole of the unfiltered liquid in the filter casing of the unit being cleaned will be displaced together with any foreign matter dislodged from the filter element into the drain tank which requires to be of no greater capacity than the volume of liquid in the filter casing external to the element and will be replaced by filtered liquid and accordingly the danger is avoided of contaminant remaining in the casing and being redeposited on the element when the filter unit is brought back into service.

After the cleaning operation has been completed the valve 18 is closed and the valve 13 opened to bring the unit 1 into service.

The drain valve 25 is then opened and the liquid in the drain tank discharged into the flow line a of the separating and purification plant illustrated in FIG. 1 wherein it is passed through a centrifugal separator C and after purification returned to the liquid in the system via the tank A. On the emptying of the drain tank the float 22 will fall and re-open the air valve so that the plant is set for the next cleaning operation.

The arrangement and operation of the purification plant is fully described in our United States Patent application Serial No. 607,807, now Patent Number 2,954,872.

As shown in the particular embodiment illustrated in the drawing, the volume of the drain tank from its base to the inlet aperture 20a in the pipe 20 substantially corresponds to the volume of unfiltered liquid normally present in a filter casing on the inflow side of the filter element and the arrangement is such that when or shortly after the reflux liquid entering the tank covers the aperture 20a, the air in the pipe 20 and in the chamber 19 will be expelled through the valve 21 and the subsequent inflow of oil into the chamber 19 will raise the float 22 and close the air release valve 21. The continued flow of reflux fluid will then serve to compress the cushion of air trapped at the upper end of the tank until its pressure corresponds to that in the outflow line 6, when the reflux flow will automatically cease.

While the deflector 15 is preferably of pyramidal or paraboloidal form it may have any other shape which will serve to deflect the reflux liquid through the wall of the filter unit.

I claim:

1. Filtering apparatus for liquids comprising a series of filter chambers a hollow filter element housed in each chamber in spaced relation to the inner wall of said chamber so as to provide a volume on the inflow side of said filter element which is normally filled with unfiltered liquid said chambers having inlet sides connected with a common inflow conduit for liquid to be filtered and outlet sides connected with a common outflow conduit for filtered liquid, a rigid hollow tapered deflector centrally located in each filter element having its narrow end directed towards the outflow side of said filter chamber, normally closed drain conduit means connected with the said inlet side of each said chamber, means for temporarily stopping the flow of unfiltered liquid into the inlet of one of said chambers, means for opening the drain conduit means of said chamber to permit a rapid reflux flow of filtered liquid from the common outflow conduit through the filter element to clean it, and means for effecting a cessation of said reflux flow comprising a sealed drain tank connected with said drain conduit means and containing air at atmospheric pressure and having a volume which exceeds by a pre-determined amount the said volume on the inflow side of said filter element, a float chamber mounted above said sealed tank, a pipe connected with said chamber and depending downwardly into said sealed tank, said pipe having an inlet located a predetermined distance below the top of said sealed tank, an air vent in said chamber, a float operated valve in said chamber operable by air and liquid displaced from said sealed tank and flowing through said pipe into said chamber to close said air vent before said sealed tank is completely filled with liquid, such that a pre-determined quantity of air will be trapped in the space between the said inlet of the pipe and the top of said sealed tank so as to be compressed by the continued flow of liquid into the said sealed tank until its pressure substantially corresponds to the pressure prevailing in said common outflow conduit.

2. Filtering apparatus for liquids comprising a series of filter chambers, a sleeve like filter element housed in each chamber in spaced relation to the inner wall of said chamber so as to provide a volume on the inflow side of said filter element which is normally filled with unfiltered liquid, said chamber having inlet sides connected with a common inflow conduit and outlet sides connected with a common outflow conduit, a rigid hollow tapered deflector centrally located in each sleeve like filter element having its narrow end directed towards the outflow side of said filter chamber, normally closed drain conduit means connected wtih the inlet side of said chamber, means for temporarily stopping the flow of unfiltered liquid into the inlet of one of said chambers, means for opening the drain conduit means of said chamber to permit a rapid reflux flow of filtered liquid from the common outflow conduit into said sleeve so as to be deflected by said deflector through the said sleeve like filter element to clean it, and means for effecting a cessation of said reflux flow comprising a drain tank connected with said drain conduit means and containing air at atmospheric pressure and having a volume which exceeds by a predetermined amount the said volume on the inflow side of said filter element, a cover closing the upper end of said tank a float chamber mounted above said cover, a pipe connected with said chamber and depending downwardly through said cover into said tank, said pipe having an inlet located a predetermined distance below said cover, an air vent in said chamber, a float operaed valve in said chamber operable by air and liquid displaced from said tank and flowing through said pipe into said chamber to close said air vent before said tank is completely filled with liquid, such that a predetermined quantity of air will be trapped in the space between the said inlet of the pipe and said cover so as to be compressed by the continued flow of liquid into the said tank until its pressure substantially corresponds to the pressure prevailing in said common outflow conduit.

References Cited in the file of this patent

UNITED STATES PATENTS

| | | |
|---|---|---|
| 582,432 | O'Neil et al. | May 11, 1897 |
| 2,079,475 | Williams et al. | May 4, 1937 |
| 2,271,814 | Coolidge | Feb. 3, 1942 |
| 2,661,845 | Sullivan | Dec. 8, 1953 |
| 2,954,872 | Liddell | Oct. 4, 1960 |